Feb. 12, 1946.    M. REISS    2,394,635
MAGNIFYING LENS SYSTEM
Filed July 13, 1944
FIG. 1.
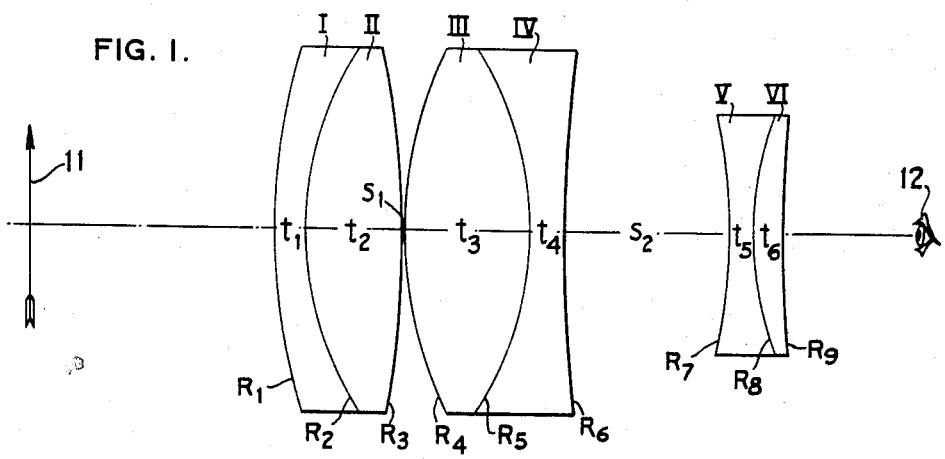
FIG. 2.
| EF = 100 mm. ANGULAR FIELD = 12° | | | | |
|---|---|---|---|---|
| LENS | N | V | RADII | THICKNESSES |
| I | 1.65 | 34. | $R_1 = +138$ mm. | $t_1 = 7.$ mm. |
| II | 1.61 | 59. | $R_2 = + 73.$ | $t_2 = 22.$ |
|  |  |  | $R_3 = -202.$ | $S_1 = 0.2$ |
| III | 1.62 | 60. | $R_4 = + 91.$ | $t_3 = 29.$ |
| IV | 1.65 | 34. | $R_5 = - 73.$ | $t_4 = 7.$ |
|  |  |  | $R_6 = +225.$ | $S_2 = 38.$ |
| V | 1.62 | 55. | $R_7 = -107.$ | $t_5 = 4.$ |
| VI | 1.62 | 37. | $R_8 = + 73.$ | $t_6 = 5.$ |
|  |  |  | $R_9 = +270.$ |  |
FIG. 3.
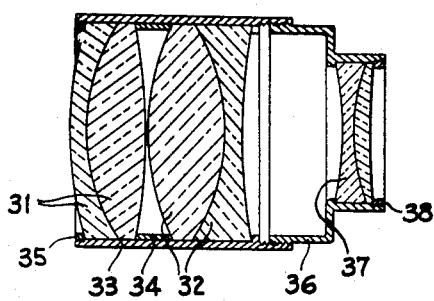
MAX REISS
*INVENTOR*
BY
*ATTY & AG'T*

Patented Feb. 12, 1946

2,394,635

UNITED STATES PATENT OFFICE 2,394,635

MAGNIFYING LENS SYSTEM

Max Reiss, Rochester, N. Y., assignor to Eastman Kodak Company, Rochester, N. Y., a corporation of New Jersey Application July 13, 1944, Serial No. 544,700

7 Claims. (Cl. 88—57)

This invention relates to magnifying lenses.

An object of the invention is to provide a magnifying lens with a large field of view and a large working distance between lens and object plane, and convenient to use even when made up in a focal length shorter than 60 mm.

Another object of the invention is to provide a magnifying lens system which possesses these advantages and which is convertible so that a part of the system forms a higher power magnifier with a shorter working distance.

The use of a negative member spaced from a positive member for the purpose of shifting the nodal points and increasing the focal distance on the other side of the positive member relative to the equivalent focal length is known in the field of telephoto and wide-angle objectives or attachments and other related fields.

Some attempts have been made to employ this arrangement in a magnifying lens system. Even though it is widely recognized that the utility of such a lens would be great and the applications many, the results have been discouraging and the feeling has been prevalent that a 3X magnification is about the best that could be looked for in such a system if it is to cover a useful field of view.

The present invention on the other hand gives up to at least 6X magnification without appreciable loss of image quality.

According to the present invention, a telephoto-type magnifying lens system corrected for coma, curvature of field, astigmatism and lateral color over a field of view of more than 9° from the axis and for an eyepoint distance in air of at least 0.2 F where F is the focal length of the system is made up consisting of a front positive member facing the object plane and a rear negative member facing the eyepoint such that the positive member comprises at least two positive components of which the front one is biconvex and the rear one is meniscus concave toward the rear end of which at least one is compound and comprises a positive element cemented to a negative element the index of refraction of which is at least 0.01 greater than that of the positive element; the negative member comprises a compound biconcave component, and the two members are spaced apart more than 1/8 F and less than 1/2 F.

The combination of all these features results in a superior magnifying lens with a large working distance, which can be made up in a focal length shorter than 60 mm., thus giving a magnification greater than 4X, and still be convenient to use without getting the eye uncomfortably close to the lens and without moving the eye about when examining the magnified image of the object field.

It will be readily understood by all skilled in the art that by "compound component" is meant a component consisting of two or more elements, at least one being of each sign, the element or elements having the same sign as the whole component being made of crown glass and the others of flint glass or their equivalents so as to correct the chromatic aberration.

According to a further development of the invention, two components of the positive member are compound and each comprises a positive element and a negative element cemented thereto whose refractive index is at least 0.01 greater on the average than that of the positive element. Each of the two cemented surfaces thus has negative power.

It is preferred that the two positive compound components be so arranged that the two positive elements are located between the two negative elements. When this preferred arrangement is used, the index difference at the (negative) cemented surfaces should be less than 0.07. Otherwise the field curvature tends to be over-corrected. Certain other arrangements are practical in which this index difference is advantageously greater than this and in fact may be as large as available glass types permit. I have found the preferred arrangement to be superior, however.

It is advantageous that the rear surface of the front positive component be more strongly curved than the front surface of said component, in order to minimize the distortion of the system.

It is also advantageous in the preferred embodiment to have the average radius of curvature of the two cemented surfaces greater than three-quarters of the focal length of the positive member.

According to still another feature of the invention, the negative member is detachably mounted in alignment with the positive member and the lens system is thus convertible, the entire system being a highly corrected telephoto type magnifier of moderately high power and the positive member alone being excellent as an ordinary magnifier of still higher power.

In the accompanying drawing:

Fig. 1 shows an axial cross section of the optical elements of a lens system according to the invention.

Fig. 2 gives specifications for one embodiment of the invention.

Fig. 3 shows a mounting for the lens system according to one feature of the invention.

In Fig. 1 the object plane is indicated by the arrow 11 and the eyepoint by the eye 12. The lens elements, thicknesses, spacings, and radii are designated in the customary way and numbered from front to rear.

The specifications for the lens system shown in Figs. 1 and 2 are as follows:

EF=100.0       Angular field=12°

| Lens | N | V | Radii | Thicknesses |
|---|---|---|---|---|
| I | 1.65 | 34 | $R_1=+138$ mm. | $t_1=7$ mm. |
| II | 1.61 | 59 | $R_2=+73$ | $t_2=22$ |
|  |  |  | $R_3=-202$ | $s_1=0.2$ |
| III | 1.62 | 60 | $R_4=+91$ | $t_3=29$ |
| IV | 1.65 | 34 | $R_5=-73$ | $t_4=7$ |
|  |  |  | $R_6=+225$ | $s_2=38$ |
| V | 1.62 | 55 | $R_7=-107$ | $t_5=4$ |
| VI | 1.62 | 37 | $R_8=+73$ | $t_6=5$ |
|  |  |  | $R_9=+270$ |  |

Fig. 3 shows a convertible magnifying lens system similar to that shown in Figs. 1 and 2. The two positive components 31, 32 are mounted in the tube 33, spaced by a ring 34, and retained by a threaded ring 35. The tube 33 is threaded at one end to take the retaining ring 35 and at the other end to take the mount 36 of the negative component 37. The negative component is shown as held in its mount by a retaining ring 38. Alternatively it may be spun in, that is a thin edge of metal may be bent over around its periphery to hold it in. By screwing the negative lens mount 36 into the lens tube 33 the telephoto magnifier is assembled, and by unscrewing these parts and using only the positive components it is converted into a higher power ordinary magnifier in accordance with one feature of the invention.

Reference is made to the description of this magnifying lens I published under the title "The Design of a Telephoto Magnifier" in the Journal of the Optical Society of America, vol. 33, No. 12, 641–651, December 1943.

What I claim is:

1. A telephoto-type magnifying lens system corrected for coma, curvature of field, astigmatism, and lateral color over a field of view of at least 9° from the axis and for an eye point distance in air of at least 0.2 F where F is the focal length of the lens system and consisting of a front positive member facing the object plane and a rear negative member facing the eye point, in which the positive member comprises at least two positive components of which the front one is biconvex and the rear one is meniscus concave toward the rear end of which at least one is compound and comprises a positive element cemented to a negative element whose index of refraction is at least 0.01 greater than that of the positive element, the negative member comprises a compound biconcave component, and the two members are spaced apart more than ⅛ F and less than ½ F.

2. A lens system according to claim 1 in which two components of the positive member are compound and each comprises a positive element and a negative element cemented thereto whose refractive index is at least 0.01 greater on the average than that of the positive element.

3. A lens system according to claim 1 in which two components of the positive member are compound and each comprises a positive element and a negative element cemented thereto whose refractive index is on the average at least 0.01 greater than that of the positive element, the two said positive elements being located between the two said negative elements.

4. A lens system according to claim 1 in which the positive member consists entirely of two achromatic doublets in which the two cemented surfaces have negative power.

5. A lens system according to claim 1 in which the positive member consists of two achromatic doublets in which the two cemented surfaces are concave toward each other and have negative power.

6. A lens system according to claim 1 in which the negative member consists of a biconcave achromatic cemented doublet.

7. A magnifier lens having approximately the following specifications:

| Lens | N | V | Radii | Thicknesses |
|---|---|---|---|---|
| I | 1.65 | 34 | $R_1=+1.4$ F | $t_1=.07$ F |
| II | 1.61 | 59 | $R_2=+.7$ F | $t_2=.2$ F |
|  |  |  | $R_3=-2.0$ F | $s_1=<.01$ F |
| III | 1.62 | 60 | $R_4=+.9$ F | $t_3=.3$ F |
| IV | 1.65 | 34 | $R_5=-.7$ F | $t_4=.07$ F |
|  |  |  | $R_6=+2.3$ F | $s_2=.4$ F |
| V | 1.62 | 55 | $R_7=-1.1$ F | $t_5=.04$ F |
| VI | 1.62 | 37 | $R_8=+.7$ F | $t_6=.05$ F |
|  |  |  | $R_9=+2.7$ F |  | where the first column numbers the elements from front to rear, N is the index of refraction for the D line of the spectrum, V is the dispersive index, R, t, and s are the radii of surface curvature, thicknesses and air spaces from front to rear, F is the focal length of the lens and + and − signs indicate surfaces respectively convex and concave to the front.

MAX REISS.